(12) United States Patent
Kuo

(10) Patent No.: US 7,492,581 B2
(45) Date of Patent: Feb. 17, 2009

(54) PORTABLE COMPUTER WITH HANDLE MECHANISM

(75) Inventor: Szu-Wei Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/863,293

(22) Filed: Sep. 28, 2007

(65) Prior Publication Data
US 2008/0186665 A1 Aug. 7, 2008

(30) Foreign Application Priority Data
Feb. 6, 2007 (CN) .................... 2007 1 0200157

(51) Int. Cl.
*G06F 1/16* (2006.01)
*B65D 25/10* (2006.01)

(52) U.S. Cl. .................... 361/683; 312/244; 70/213; 220/318; 220/756; 220/764; 16/334

(58) Field of Classification Search ......... 361/679–686, 361/724–727; 248/917, 918; 312/223.1, 312/223.2, 244, 902; 70/58, 213, 214, 278.1, 70/278.4, 278.5, 286–332, 175–180; 220/318, 220/756, 762–766; 16/334; 292/252, 336.3
See application file for complete search history.

(56) References Cited

U.S. PATENT DOCUMENTS

| | | | | |
|---|---|---|---|---|
| 4,646,547 A | * | 3/1987 | Scelba et al. | 70/312 |
| 6,097,592 A | * | 8/2000 | Seo et al. | 361/683 |
| 6,115,883 A | * | 9/2000 | Um | 16/405 |
| 2007/0159778 A1 | * | 7/2007 | Lin et al. | 361/683 |

* cited by examiner

*Primary Examiner*—Jayprakash N Gandhi
*Assistant Examiner*—Nidhi Desai
(74) *Attorney, Agent, or Firm*—Frank R. Niranjan

(57) ABSTRACT

A handle mechanism for a portable computer having a base and a cover movably mounted to the base, includes a handle, two fixing assemblies, and a coded lock. The handle includes a crossbar, and two arms respectively protruding from opposite ends of the crossbar. A mortise hole is defined in one of the arms. The fixing assemblies are respectively configured for attaching the arms of the handle to the base. The coded lock is fixed to the base near one of the arms of the handle. The coded lock includes a tenon portion. The tenon portion is capable of extending into the mortise hole of the handle to lock the handle. The handle mechanism acts as both a handle and a lock for carrying and locking the portable computer.

14 Claims, 5 Drawing Sheets

PORTABLE COMPUTER WITH HANDLE MECHANISM

BACKGROUND

1. Field of the Invention

The present invention relates to portable computers, and more particularly to a portable computer having a handle mechanism.

2. Description of Related Art

Portable computers, such as laptop computers and foldable computers, have become increasingly popular for general use. To facilitate carrying a portable computer, a handle is attached to the portable computer. However, the handle only has the function of being used to carry the computer, which departs from a spirit that parts of the portable computer should be made ever smaller while at the same time being multi-functional.

What is desired, therefore, is a portable computer having a handle mechanism that not only aids in carrying the portable computer but also has a function of locking the portable computer.

SUMMARY

An exemplary handle mechanism for a portable computer having a base and a cover movably mounted to the base, includes a handle, two fixing assemblies, and a coded lock. The handle includes a crossbar, and two arms respectively protruding from opposite ends of the crossbar. A mortise hole is defined in one of the arms. The fixing assemblies are respectively configured for attaching the arms of the handle to the base. The coded lock is fixed to the base near one of the arms of the handle. The coded lock includes a tenon portion. The tenon portion is capable of extending into the mortise hole of the handle to lock the handle.

Other advantages and novel features will become more apparent from the following detailed description when taken in conjunction with the accompanying drawings, in which:

DETAILED DESCRIPTION

Figure 1:
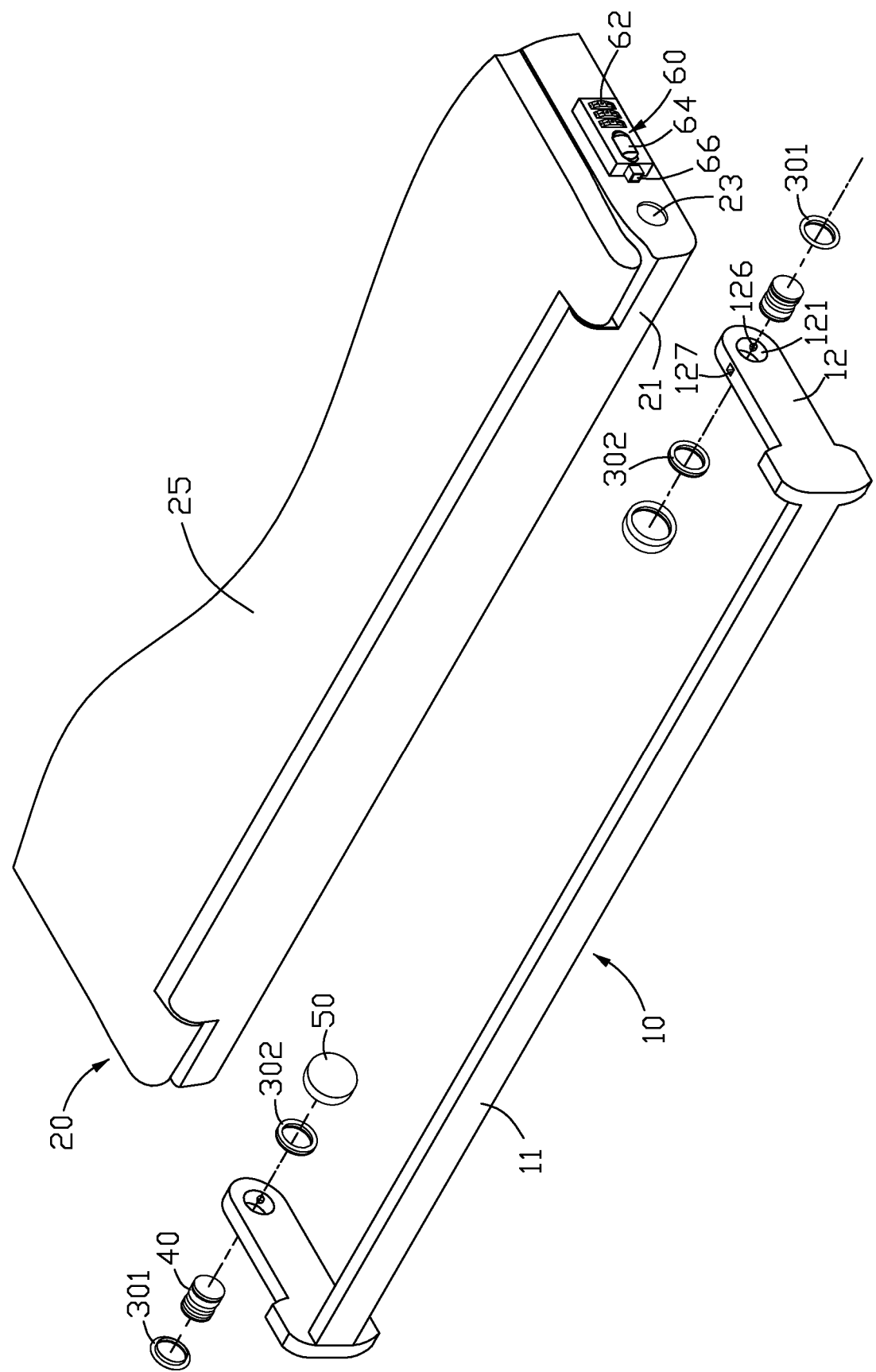
FIG. 1 is an exploded, isometric view of a portable computer in accordance with an embodiment of the present invention, the portable computer including a base, a cover, and a handle mechanism.
Figure 2:
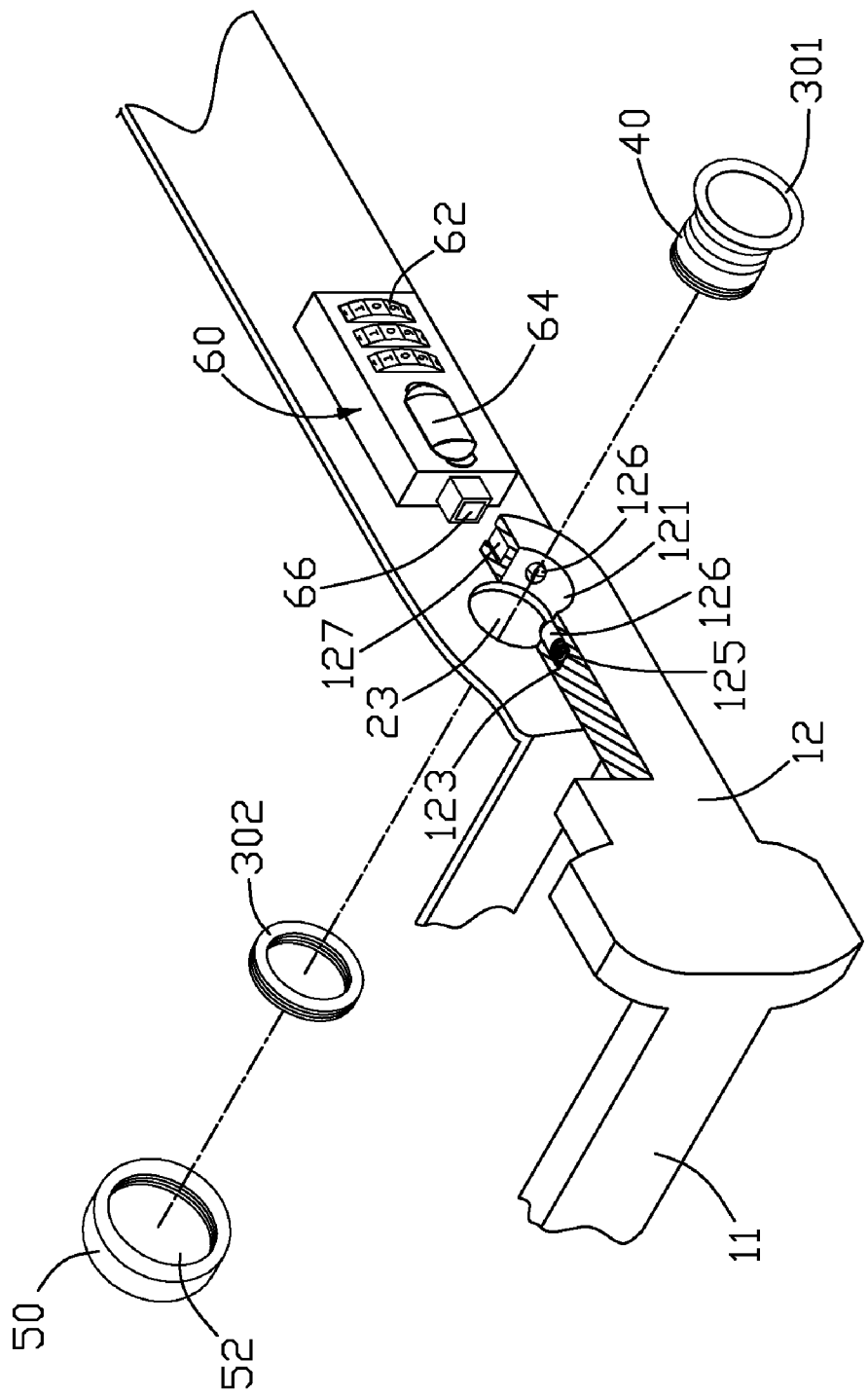
FIG. 2 is a partial view of FIG. 1, but showing a handle of the handle mechanism attached to the base and partially cutaway.

Referring to FIGS. 1 and 2, a portable computer in accordance with an embodiment of the present invention includes a computer body 20, such as a foldable computer, and a handle mechanism 10. The handle mechanism 10 not only aids in carrying the computer body 20, but also functions as a lock for the computer body 20. The handle mechanism includes a handle 10, a pair of fixing assemblies, and a coded lock 60.

The computer body 20 includes a base 21 and a cover 25 pivotably mounted to the base 21. A mounting hole 23 is defined in a rear portion of each of two opposite lateral sides of the base 21.

The handle 10 includes a crossbar 11, and two arms 12 perpendicularly protruding from opposite ends of the crossbar 11, respectively. A through hole 121 is defined in each arm 12 near a distal end. Three blind holes 123 are defined in an inner wall bounding each through hole 121 of the arm 12. An elastic member 125 abuts against a bottom wall of each blind hole 123, with an end thereof. A post 126 abutting against an opposite end of the corresponding elastic member 125 is received in each of the blind holes 123. The elastic members 125 are coil springs in the present embodiment. Three mortise holes 127 (see also FIGS. 4 and 5) are defined in an outer surface around the through hole 121 of one of the arms 12.

Each fixing assembly includes a pair of annular bushings 301, 302, a screw 40, and a cap 50. The outside diameter of each of the bushings 301 is greater than the diameter of the corresponding through hole 121 of the handle 10, and the outside diameter of the bushing 302 is greater than the diameter of the corresponding mounting hole 23 of the base 21. The bushings 301 are internally threaded, and the bushings 302 are threaded inside and out. The pairs of bushings 301, 302 can engage with the corresponding screw 40 via the internal threads thereof. The cap 50 is internally threaded, round with two flat ends. A hole 52 is defined in one end of the cap 50. The cap 50 can engage with the corresponding bushing 302 via the internal thread of the cap 50 and the external thread of the bushing 302.

The coded lock 60, which is configured to attach to one of the lateral sides of the base 21 near the corresponding mounting hole 23, includes a code setting portion 62, an operating portion 64 slidably mounted near the code setting portion 62, and an extendable tenon portion 66 set therein and connected with the operating portion 64. The tenon portion 66 is able to extend into one of the mortise holes 127 of the handle 10.

Figure 3:
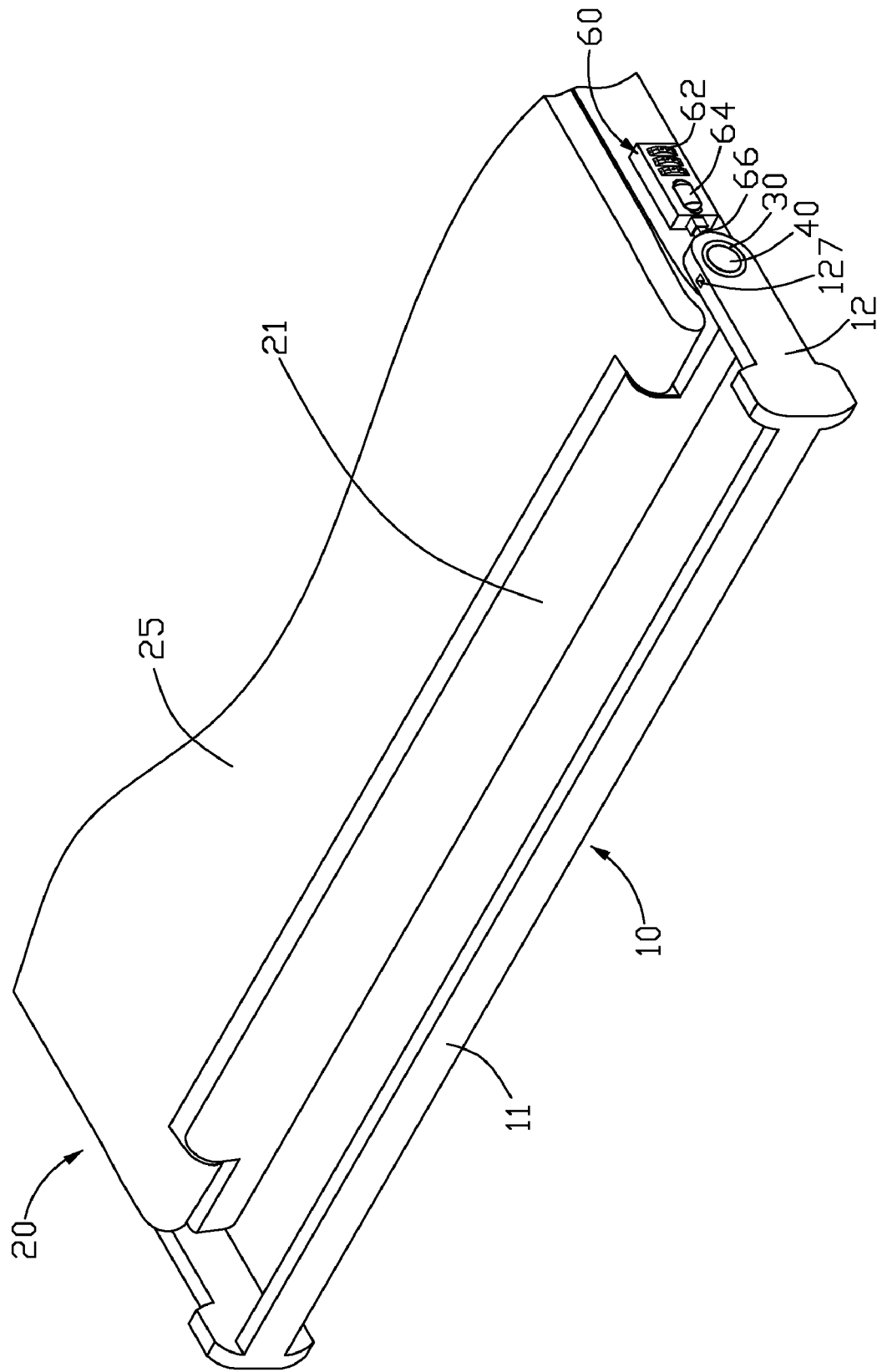
FIG. 3 is an assembled view of FIG. 1.
Figure 4:
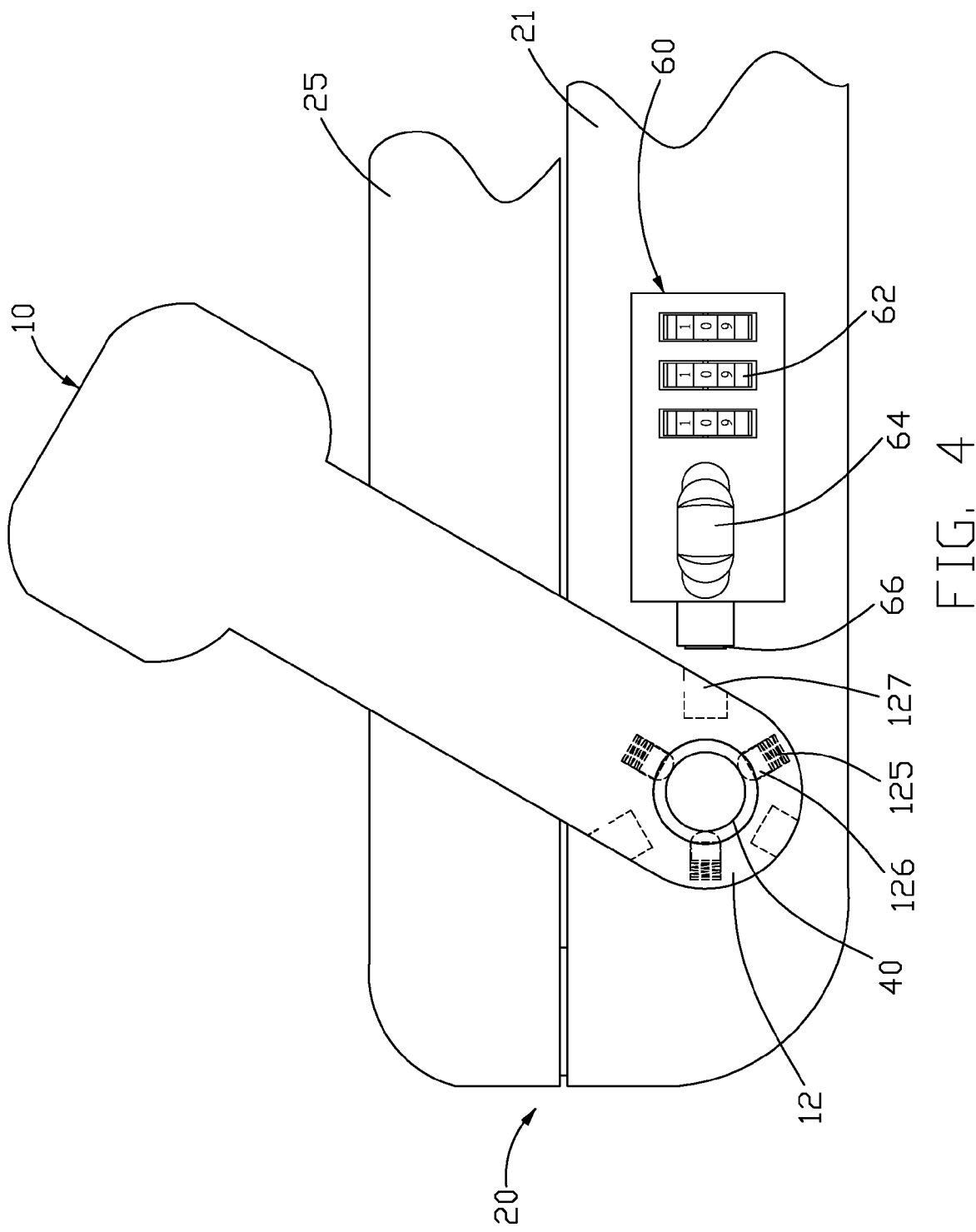
FIG. 4 is a right side elevational view of FIG. 3, but showing the handle in another position.

Referring also to FIGS. 3 and 4, in assembly, the arms 12 of the handle 10 are respectively placed at opposite sides of the base 21, with the through holes 121 of the handle 10 aligning with the corresponding mounting holes 23 of the base 21. Each of the screws 40 is inserted through a corresponding through hole 121 of the handle 10 and engaged in a corresponding mounting hole 23 to be fixed relative to the base 21. The posts 126 in the corresponding through holes 121 of the handle 10 prop up the corresponding screws 40 under the force of the corresponding elastic members 125. Each of the bushings 302 is engaged around a corresponding screw 40 from inside of the base 21 of the computer body 20. Each of the caps 50 is mounted to the corresponding bushing 302. Each of the bushings 301 is engaged around the corresponding screw 40 from outside of the base 21 and abuts against the inner wall of the through hole 121 of the corresponding arm 12 of the handle 10. The bushings 301, 302 are used here to prevent the screws 40 from disengaging from the corresponding through holes 121 and the corresponding mounting holes 23. The handle 10 is rotatable relative to the screws 40. Thus, the handle 10 is rotatably mounted to the base 21 of the computer body 20. Because of the elastic members 125 and the corresponding posts 126 elastically propping up the corresponding screws 40, the handle 10 can not rotate randomly relative to the screw and be retained to any one desired position.

Figure 5:
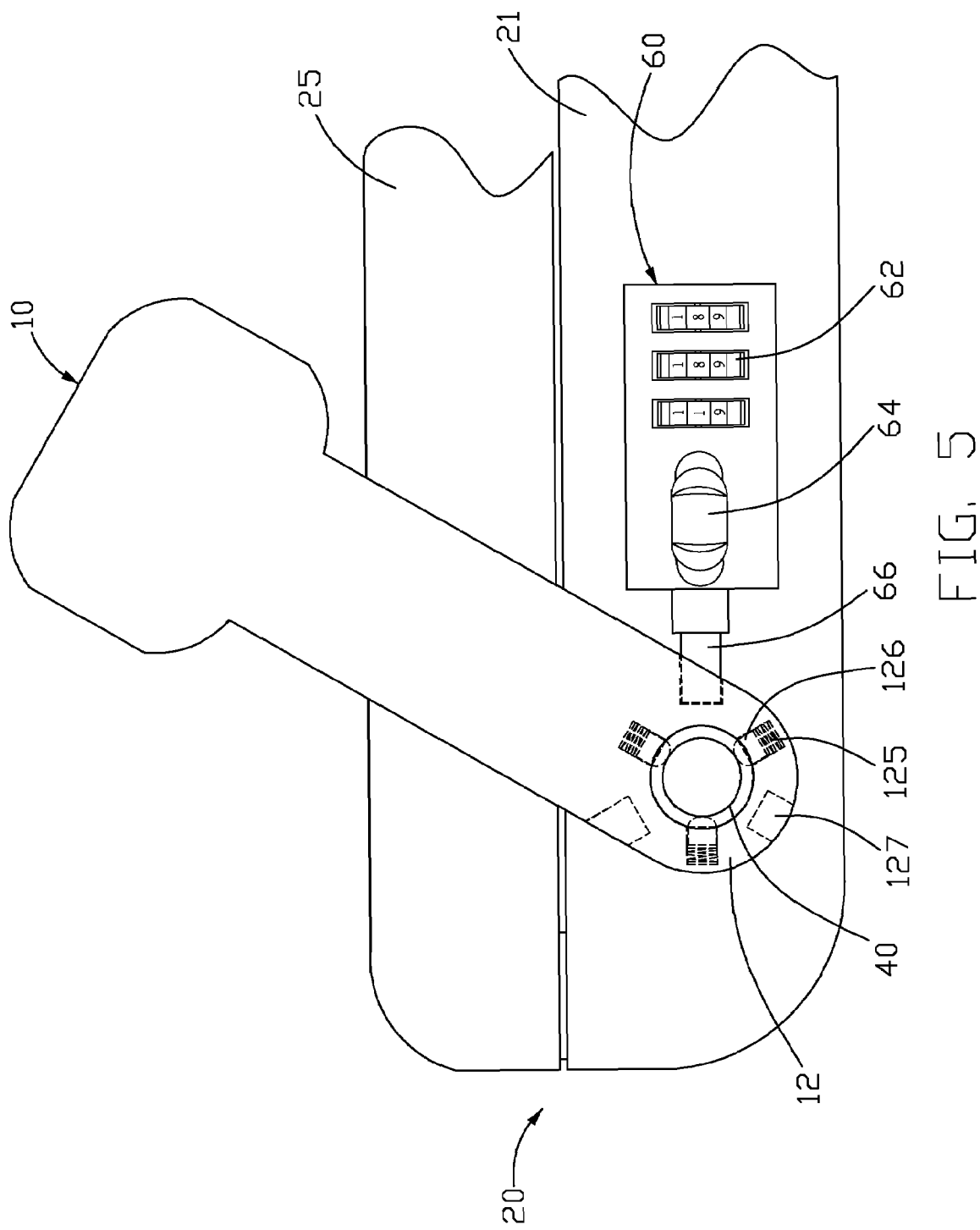
FIG. 5 is similar to FIG. 4, but showing the portable computer locked.

Referring also to FIG. 5, in use, a code is preset via operating the code setting portion 62 of the coded lock 60. The handle 10 is rotated to a desired position where one of the mortise holes 127 of the handle 10 aligns with the tenon portion 66 of the coded lock 60. The operating portion 64 of the coded lock 60 is operated to drive the tenon portion 66 to extend into the mortise hole 127. The code setting portion 62 is disarranged so that the operating portion 64 together with the tenon portion 66 become immovable. Thus, the handle 10 is locked in place. In this way, the crossbar 11 of the handle 10 can be locked to block the cover 25 of the computer body 20 to prevent the cover 25 from being opened by unauthorized persons. When the code is entered, the tenon portion 66 can be retracted to disengage from the mortise hole 127 of the handle 10 via operation of the operating portion 64. Thus, the handle 10 can be rotated away from the cover 25 whereby the cover 25 can be opened.

It is believed that the present embodiment and its advantage will be understood from the foregoing description, and it will be apparent that various changes may be made thereto without departing from the spirit and scope of the invention or sacrificing all of its material advantages, the example hereinbefore described merely being an exemplary embodiment of the invention.

What is claimed is:

1. A handle mechanism for a portable computer having a base and a cover rotatably mounted to the base, comprising:
   a handle comprising a crossbar, and two arms respectively protruding from opposite ends of the crossbar, one of the arms defining a mortise hole therein;
   two fixing assemblies respectively configured for rotatably attaching the arms of the handle to the base; and
   a coded lock configured to be fixed to the base near one of the arms of the handle, the coded lock comprising a tenon portion, the tenon portion capable of extending into the mortise hale of the handle to lock the handle in place;
   wherein a through hole is defined in each of the arms near a distal end thereof, each of the fixing assemblies comprises a screw inserted through a corresponding through hole of the handle and configured for engaging in a corresponding mounting hole of the base, the arms of the handle are rotatable relative to the corresponding screws, and
   a plurality of blind holes is defined in an inner wall bounding the through hole of one of the arms, an elastic member abuts against a bottom wall of each of the blind holes with an end thereof, a post abutting against an opposite end of the corresponding elastic member is received in each of the blind holes configured to abut against the screw to retain the handle in any one desired position.

2. The handle mechanism as claimed in claim 1, wherein each of the fixing assemblies further comprises two bushings respectively engaged with opposite ends of the screw, for preventing the screw from disengaging from the corresponding through hole of the handle and the corresponding mounting hole of the base.

3. The handle mechanism as claimed in claim 2, wherein each of the fixing assemblies still further comprises a cap configured for being located in an inner side of the base and covering the corresponding end of the screw and a corresponding bushing mounted to said corresponding end.

4. The handle mechanism as claimed in claim 1, wherein the elastic member is a coil spring.

5. The handle mechanism as claimed in claim 1, wherein the coded lock further comprises a code setting portion, and an operating portion slidably mounted near the code setting portion, the tenon portion is connected with the operating portion.

6. A portable computer comprising:
   a base;
   a cover rotatably mourned to the base and rotatable relative to the base between an open position and a closed position;
   a handle comprising a crossbar, and two arms respectively protruding from opposite ends of the crossbar, one of the arms defining a plurality of mortise holes;
   two fixing assemblies respectively rotatably attaching the arms of the handle to opposite sides of the base; and
   a coded lock fixed to the base near one of the arms of the handle, the coded lock comprising a tenon portion, the tenon portion capable of extending into the mortise holes of the handle to lock the handle at different angles.

7. The portable computer as claimed in claim 6, wherein a through hole is defined in each of the arms near a distal end thereof, a mounting hole is defined in each of the opposite sides of the base, each of the fixing assemblies comprises a screw received in a corresponding through hole of the handle and a corresponding mounting hole of the base, the arms of the handle are rotatable relative to the corresponding screws.

8. The portable computer as claimed in claim 7, wherein each of the fixing assemblies further comprises two bushings respectively engaged with opposite ends of the screw, for preventing the screw from disengaging from the corresponding through hole of the handle and the corresponding mounting hole of the base.

9. The portable computer as claimed in claim 8, wherein each of the fixing assemblies still further comprises a cap located in an inner side of the base and covering the corresponding end of the screw and a corresponding bushing mounted to said corresponding end.

10. The portable computer as claimed in claim 7, wherein a plurality of blind holes is defined in an inner wall bounding the through hole of one of the arms, an elastic member abuts against a bottom wall of each of the blind boles with an end thereof, a post abutting against an opposite end of the corresponding elastic member is received in each of the blind holes configured to abut against the screw to retain the handle in any one desired position.

11. The portable computer as claimed in claim 10, wherein the elastic member is a coil spring.

12. The portable computer as claimed in claim 6, wherein the coded lock further comprises a code setting portion for presetting a code, and an operating portion slidably mounted near the code setting portion, the tenon portion is connected with the operating portion such that when the preset code is entered, the tenon portion of the lock is capable of being retracted to disengage from the mortise hole of the handle via operation of the operating portion.

13. A portable electronic device comprising:
   a base;
   a cover mounted to the base and rotatable relative to the base between a closed position where the cover covers the base and an open position where the cover uncovers the base;
   a handle comprising a crossbar and two arms respectively extending from opposite ends of the crossbar;
   two fixing assemblies respectively rotatably attaching the arms of the handle to opposite sides of the base such that the portable electronic device is capable of being carried via the crossbar; and
   a coded lock configured to lock one of the arms to the base, the coded lock being attached to one of said one of the arms and the base, the other one of said one of the arms and the base defining a mortise hole, the coded lock comprising a tenon portion capable of extending into the mortise bole to lock the handle in place to allow the crossbar blocking the cover from rotating to the open position from the closed position;

wherein a through hole is defined in each of the arms, a mounting hole is defined in each of the opposite sides of the base, each of the fixing assemblies comprises a screw received in a corresponding through hole of the handle and a corresponding mounting hole of the base, and the arms of the handle are rotatable relative to the corresponding screws which are fixed relative to the base;

a plurality of blind holes is defined in an inner wall bounding the through hole of each of the arms, an elastic member is received within each of the blind holes, a post is received in each of the blind holes with one end thereof abutting against the corresponding elastic member and an opposite end thereof extending into the through hole to abut against the screw to prevent the handle from rotating randomly relative to the screw.

14. The portable electronic device as claimed in claim 13, wherein the coded lock is attached to one of the opposite sides of the base and the mortise hole is defined in said one of the arms.

* * * * *